US011276016B2

(12) United States Patent
Hildebrand et al.

(10) Patent No.: US 11,276,016 B2
(45) Date of Patent: Mar. 15, 2022

(54) AUTOMATIC WELLBORE ACTIVITY SCHEDULE ADJUSTMENT METHOD AND SYSTEM

(71) Applicant: Schlumberger Technology Corporation, Sugar Land, TX (US)

(72) Inventors: Ginger Hildebrand, Houston, TX (US); Chunling Gu Coffman, Houston, TX (US); John Christian Luppens, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 308 days.

(21) Appl. No.: 16/371,732

(22) Filed: Apr. 1, 2019

(65) Prior Publication Data

US 2019/0228359 A1 Jul. 25, 2019

Related U.S. Application Data

(63) Continuation of application No. 14/535,200, filed on Nov. 6, 2014, now Pat. No. 10,248,920.

(Continued)

(51) Int. Cl.
*G06Q 30/00* (2012.01)
*G06Q 10/06* (2012.01)
(Continued)

(52) U.S. Cl.
CPC ............ *G06Q 10/06312* (2013.01); *G06Q 10/06314* (2013.01); *E21B 44/00* (2013.01);
(Continued)

(58) Field of Classification Search
CPC ....... G06Q 10/06312; G06Q 10/06314; G06Q 10/06395; G06Q 10/103; E21B 47/017;
(Continued)

(56) References Cited

U.S. PATENT DOCUMENTS 6,233,498 B1 5/2001 King et al.
2004/0040746 A1* 3/2004 Niedermayr ............ E21B 44/00
175/38

(Continued)

OTHER PUBLICATIONS

Dosch et al., Drilling And Operating Oil, Gas, And Geothermal Wells In An H2S Environment, https://www.osti.gov/servlets/purl/5648271-b3aQ5N/, United States: N. p. 1981. Web. doi:10.2172/5648271 (Year: 1981).*

(Continued)

*Primary Examiner* — Patricia H Munson
*Assistant Examiner* — Uche Byrd
(74) *Attorney, Agent, or Firm* — Alec J. McGinn

(57) ABSTRACT

A method can include determining an ideal activity speed profile of an activity for a well, where the ideal activity speed profile of the activity for the well corresponds to a length of the well; forecasting a start time and a stop time using the ideal activity speed profile of the activity; generating a drilling plan using the start time and the stop time where another activity commences after the stop time; during performance of the activity for the well, receiving data indicative of an actual activity speed of the activity for the well for a corresponding length of the well; during the performance of the activity, deciding to make an adjustment to the performance of the activity for the well using the ideal activity speed profile and the actual activity speed of the activity for the well; and adjusting the stop time of the drilling plan.

16 Claims, 9 Drawing Sheets

Related U.S. Application Data

(60) Provisional application No. 61/903,418, filed on Nov. 13, 2013.

(51) Int. Cl.
| | |
|---|---|
| *E21B 44/00* | (2006.01) |
| *G06Q 10/10* | (2012.01) |
| *E21B 44/10* | (2006.01) |
| *E21B 45/00* | (2006.01) |
| *E21B 44/04* | (2006.01) |
| *E21B 47/017* | (2012.01) |

(52) U.S. Cl.
CPC ............... *E21B 44/04* (2013.01); *E21B 44/10* (2013.01); *E21B 45/00* (2013.01); *E21B 47/017* (2020.05); *G06Q 10/06395* (2013.01); *G06Q 10/103* (2013.01)

(58) Field of Classification Search
CPC .......... E21B 44/00; E21B 44/04; E21B 44/10; E21B 45/00
See application file for complete search history.

(56) References Cited

U.S. PATENT DOCUMENTS

| | | | |
|---|---|---|---|
| 2005/0096847 A1* | 5/2005 | Huang | .................... E21B 44/00 702/9 |
| 2005/0267719 A1 | 12/2005 | Foucault | |
| 2006/0037781 A1* | 2/2006 | Leuchtenberg | ......... E21B 21/08 175/25 |
| 2006/0173625 A1* | 8/2006 | Moran | .................... E21B 44/00 702/9 |
| 2007/0056727 A1 | 3/2007 | Newman | |
| 2009/0152005 A1* | 6/2009 | Chapman | .................. E21B 7/00 175/24 |
| 2011/0220410 A1 | 9/2011 | Aldred et al. | |
| 2011/0282630 A1 | 11/2011 | Rikkola et al. | |
| 2012/0227961 A1* | 9/2012 | Sehsah | .................... E21B 21/08 166/250.07 |
| 2013/0025937 A1 | 1/2013 | Pilgrim et al. | |
| 2015/0134390 A1 | 5/2015 | Hildebrand et al. | |
| 2019/0188618 A1 | 6/2019 | Hildebrand et al. | |

OTHER PUBLICATIONS

Dosch, et al., Drilling and operating oil, agas, and geothermal wells in an H/sub 2/S environment, 1981, ostilgov, Publication No. M10, retrieved at https://www.osti.gov/servlets/purl/5648271, 1981.

International Search Report and Written Opinion for the equivalent International patent application PCT/US2014/064901 dated Jul. 13, 2015.

International Preliminary Report on Patentability for the equivalent International patent application PCT/US2014/064901 dated Mar. 3, 2016.

* cited by examiner

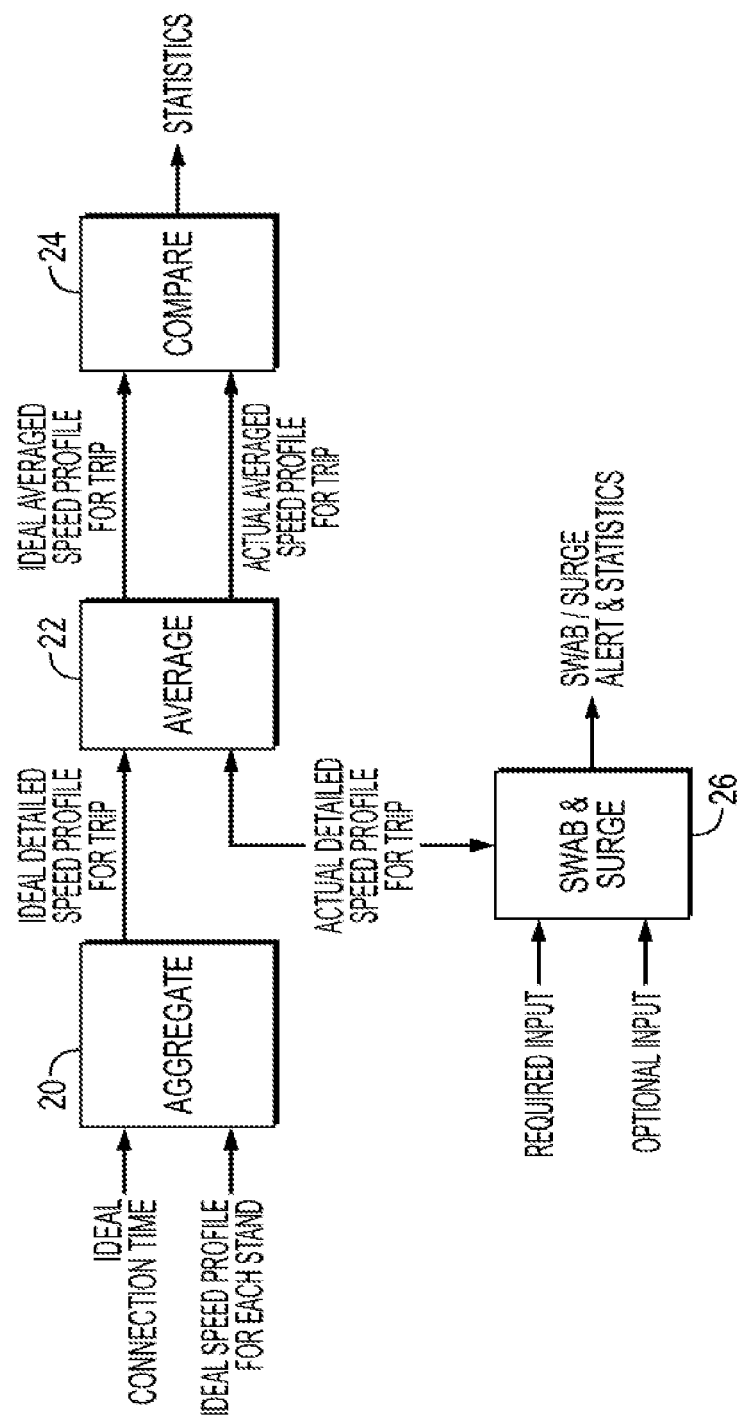

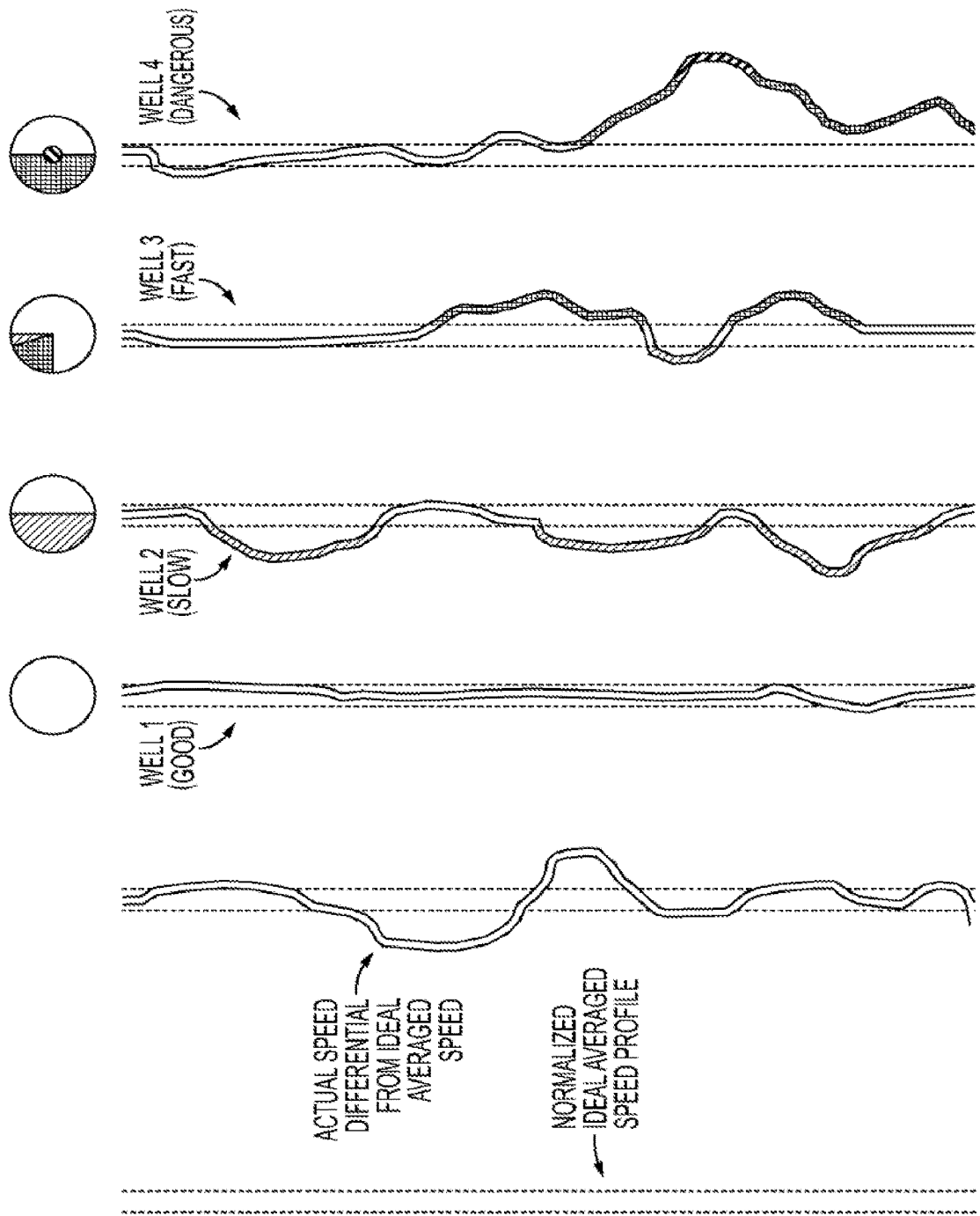

AUTOMATIC WELLBORE ACTIVITY SCHEDULE ADJUSTMENT METHOD AND SYSTEM

RELATED APPLICATIONS

This application is a continuation of a U.S. patent application having Ser. No. 14/535,200, filed 6 Nov. 2014 (issued as U.S. Pat. No. 10,248,920 on 2 Apr. 2019), which is incorporated by reference herein, which claims priority to and the benefit of a U.S. Provisional Application having Ser. No. 61/903,418, filed 13 Nov. 2013, which is incorporated by reference herein.

BACKGROUND

This disclosure relates generally to the field of wellbore drilling operations ancillary to actions that lengthen (drill) the wellbore. More specifically, the disclosure relates to method for providing operating guidance to drilling unit operating personnel for optimum speed of movement of a drill string in and out of a wellbore ("tripping"), and for collecting and comparing actual tripping measurement data to benchmark tripping data to evaluate and improve efficiency of particular drilling unit operating personnel ("crews").

Wellbore drilling operations include activities ancillary to drilling the wellbore, including, e.g., tripping a drill string (i.e., assembly of drill pipe segments as "stands" and/or "joints") out of the wellbore and back into the wellbore for the purposes, among others, of changing drill bits or other drilling tools, setting a conduit (e.g., a casing or liner) in the wellbore and circulating drill cuttings out of the wellbore along its entire length.

Tripping may be speed constrained by reason of hydrostatic fluid pressure changes in the wellbore caused by removal of the drill string from the wellbore or insertion of the drill string into the wellbore. Fluid displacement by such movement of the drill string, combined with viscous effects of the drilling fluid ("mud") in the wellbore may cause corresponding decreases or increases in the hydrostatic pressure of the mud. If the hydrostatic pressure is increased by excessive speed "tripping in" (i.e., moving the drill string into the wellbore), it is possible to exceed fracture pressure of one or more exposed formations in an uncased part of the wellbore (called "surge"). Conversely, decrease in hydrostatic pressure caused by excessive speed "tripping out" (i.e., removing the drill string from the wellbore) may result in the hydrostatic pressure being reduced below the formation fluid pressure of some exposed formations (called "swab"). Either of the foregoing may result in a wellbore pressure control emergency situation.

It is well known in the art how to calculate increases and decreases in hydrostatic pressures caused by tripping if the drill string configuration is known and the mud properties (e.g., density, viscosity) are known.

Tripping may also be speed constrained by reason of shock and vibration of the drill string as it moves through the wellbore. If shock and vibration limits are exceeded for certain drill string components, then they may be susceptible to failure during drilling operations.

It is desirable to communicate such information to a drilling unit operating crew in an easy to use form so that their operating procedures can be guided and improved. It is also desirable to accumulate statistical information over a wellbore and in some cases compare to benchmark operating procedures from other wellbores in order to improve drilling unit operating crew performance There may be differences between an original well plan, which may include a detailed sequence of specific drilling actions and ancillary actions, and an actual well construction schedule as a result of actions such as the foregoing being performed more or less quickly than originally intended, or where the originally planned sequence of specific actions is altered as a result of conditions encountered during wellbore construction. It may be desirable to be able to revise the detailed sequence to correspond to the actual performance of part of the detailed sequence and the actual wellbore conditions encountered.

SUMMARY

A method according to one aspect for scheduling wellbore construction activities includes entering a well plan into a computer. The well plan includes estimated start and stop times for a plurality of activities in a predetermined sequence. Progress of selected ones of the plurality of activities is measured during their performance. In the computer, expected ending time of at least one of the plurality of activities is recalculated based on progress thereof during that activity. In the computer, expected start and stop times are recalculated for each activity subsequent to the activity in progress based on the recalculated expected ending time. The recalculated start and stop times for each subsequent activity are displayed.

Other aspects and advantages will be apparent from the description and claims that follow.

BRIEF DESCRIPTION OF THE DRAWINGS

FIG. 6 shows an example block diagram of accumulation of statistical data for each stand for a trip and for a wellbore.

FIG. 9 shows a comparison of a normalized wellbore trip speed profile with a comparison to nearby wellbore normalized trip speed profiles for well to well performance comparison.

DETAILED DESCRIPTION

Figure 1:
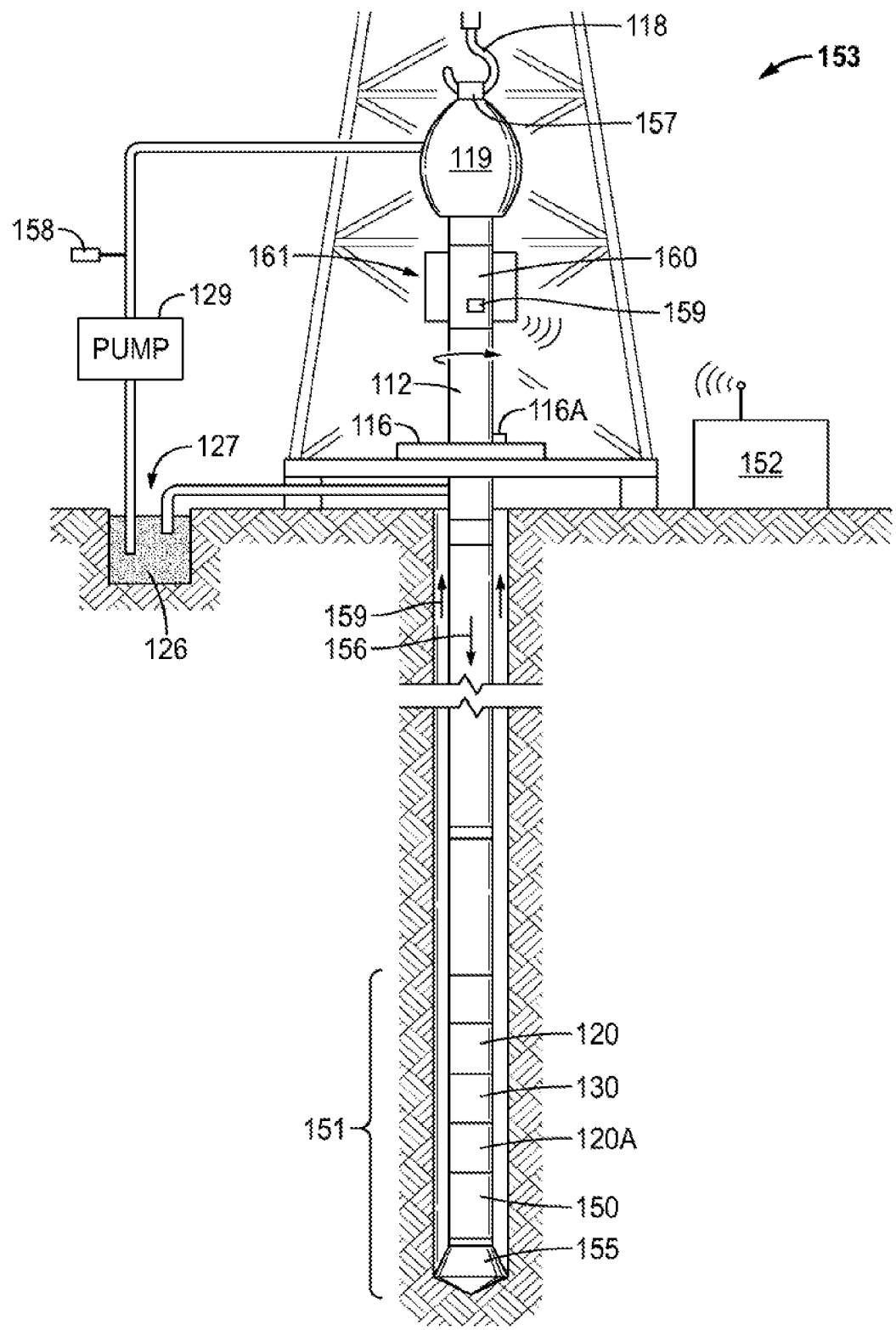
FIG. 1 shows an example drilling and measurement system.

FIG. 1 shows a simplified view of an example drilling and measurement system that may be used in some embodiments. The drilling and measurement system shown in FIG. 1 may be deployed for drilling either onshore or offshore wellbores. In a drilling and measurement system as shown in FIG. 1, a wellbore 111 may be formed in subsurface formations by rotary drilling in a manner that is well known to those skilled in the art. Although the wellbore 111 in FIG. 1 is shown as being drilled substantially straight and vertically, some embodiments may be directionally drilled, i.e. along a selected trajectory in the subsurface.

A drill string 112 is suspended within the wellbore 111 and has a bottom hole assembly (BHA) 151 which includes a drill bit 155 at its lower (distal) end. The surface portion of the drilling and measurement system includes a platform and derrick assembly 153 positioned over the wellbore 111. The platform and derrick assembly 153 may include a rotary table 116, kelly 117, hook 118 and rotary swivel 119 to suspend, axially move and rotate the drill string 112. In a drilling operation, the drill string 112 may be rotated by the rotary table 116 (energized by means not shown), which engages the kelly 117 at the upper end of the drill string 112. Rotational speed of the rotary table 116 and corresponding rotational speed of the drill string 112 may be measured un a rotational speed sensor 116A, which may be in signal communication with a computer in a surface logging, recording and control system 152 (explained further below). The drill string 112 may be suspended fin the wellbore 111 from a hook 118, attached to a traveling block (also not shown), through the kelly 117 and a rotary swivel 119 which permits rotation of the drill string 112 relative to the hook 118 when the rotary table 116 is operates. As is well known, a top drive system (not shown) may be used in other embodiments instead of the rotary table 116, kelly 117 and swivel rotary 119.

Drilling fluid ("mud") 126 may be stored in a tank or pit 127 disposed at the well site. A pump 129 moves the drilling fluid 126 to from the tank or pit 127 under pressure to the interior of the drill string 112 via a port in the swivel 119, which causes the drilling fluid 126 to flow downwardly through the drill string 112, as indicated by the directional arrow 156. The drilling fluid 126 travels through the interior of the drill string 112 and exits the drill string 112 via ports in the drill bit 155, and then circulates upwardly through the annulus region between the outside of the drill string 112 and the wall of the borehole, as indicated by the directional arrows 163. In this known manner, the drilling fluid lubricates the drill bit 155 and carries formation cuttings created by the drill bit 155 up to the surface as the drilling fluid 126 is returned to the pit 127 for cleaning and recirculation. Pressure of the drilling fluid as it leaves the pump 129 may be measured by a pressure sensor 158 in pressure communication with the discharge side of the pump 129 (at any position along the connection between the pump 129 discharge and the upper end of the drill string 112). The pressure sensor 158 may be in signal communication with a computer forming part of the surface logging, recording and control system 152, to be explained further below.

The drill string 112 typically includes a BHA 151 proximate its distal end. In the present example embodiment, the BHA 151 is shown as having a measurement while drilling (MWD) module 130 and one or more logging while drilling (LWD) modules 120 (with reference number 120A depicting a second LWD module 120). As used herein, the term "module" as applied to MWD and LWD devices is understood to mean either a single instrument or a suite of multiple instrument contained in a single modular device. In some embodiments, the BHA 151 may include a rotary steerable directional drilling system (RSS) and hydraulically operated drilling motor of types well known in the art, collectively shown at 150 and the drill bit 155 at the distal end.

The LWD modules 120 may be housed in one or more drill collars and may include one or more types of well logging instruments. The LWD modules 120 may include capabilities for measuring, processing, and storing information, as well as for communicating with the surface equipment. By way of example, the LWD module 120 may include, without limitation one of a nuclear magnetic resonance (NMR) well logging tool, a nuclear well logging tool, a resistivity well logging tool, an acoustic well logging tool, or a dielectric well logging tool, and so forth, and may include capabilities for measuring, processing, and storing information, and for communicating with surface equipment, e.g., the surface logging, recording and control unit 152.

The MWD module 130 may also be housed in a drill collar, and may contain one or more devices for measuring characteristics of the drill string 112 and drill bit 155. In the present embodiment, the MWD module 130 may include one or more of the following types of measuring devices: a weight-on-bit (axial load) sensor, a torque sensor, a vibration sensor, a shock sensor, a stick/slip sensor, a direction measuring device, and an inclination and geomagnetic or geodetic direction sensor set (the latter sometimes being referred to collectively as a "D & I package"). The MWD module 130 may further include an apparatus (not shown) for generating electrical power for the downhole system. For example, electrical power generated by the MWD module 130 may be used to supply power to the MWD module 130 and the LWD module(s) 120. In some embodiments, the foregoing apparatus (not shown) may include a turbine-operated generator or alternator powered by the flow of the drilling fluid 126. It is understood, however, that other electrical power and/or battery systems may be used to supply power to the MWD and/or LWD modules.

In the present example embodiment, the drilling and measurement system may include a torque sensor 159 proximate the surface. The torque sensor 159 may be implemented, for example in a sub 160 disposed proximate the top of the drill string 112, and may communicate wirelessly to a computer (see FIG. 11) in the surface logging, recording and control system 152, explained further below. In other embodiments, the torque sensor 159 may be implemented as a current sensor coupled to an electric motor (not shown) used to drive the rotary table 116. In the present example embodiment, an axial load (weight) on the hook 118 may be measured by a hookload sensor 157, which may be implemented, for example, as a strain gauge. The sub 160 may also include a hook elevation sensor 161 for determining the elevation of the hook 118 at any moment in time. The hook elevation sensor 161 may be implemented, for example as an acoustic or laser distance measuring sensor. Measurements of hook elevation with respect to time may be used to determine a rate of axial movement of the drill string 112. The hook elevation sensor may also be implemented as a rotary encoder coupled to a winch drum used to extend and retract a drill line used to raise and lower the hook (not shown in the Figure for clarity). Uses of such rate of movement, rotational speed of the rotary table 116 (or, correspondingly the drill string 112), torque and axial loading (weight) made at the surface and/or in the MWD module 130 may be used in one more computers as will be explained further below.

The operation of the MWD and LWD instruments of FIG. 1 may be controlled by, and sensor measurements from the various sensors in the MWD and LWD modules and the other sensors disposed on the drilling and measurement unit described above may be recorded and analyzed using the surface logging, recording and control system 152. The surface logging, recording and control system 152 may include one or more processor-based computing systems or computers. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 155 (e.g., as part of an inversion to obtain one or more desired formation parameters), and from the other sensors described above associated with the drilling and measurement system. The surface logging, recording and control system 152 may include one or more computer systems as will be explained with reference to FIG. 11. The other previously described sensors including the torque sensor 159, the pressure sensor 158, the hookload sensor 157 and the hook elevation sensor 161 may all be in signal communication, e.g., wirelessly or by electrical cable with the surface logging, recording and control system 152. Measurements from some of the foregoing sensors and some of the sensors in the MWD and LWD modules may be used in various embodiments to be further explained below.

1. General Description of Methods

A Guidance and Statistical Processing Method according to the present disclosure may operate with, for example, two levels of granularity: on a stand by stand (or joint by joint) basis and for an entire trip (i.e., a complete removal from or insertion into the wellbore of a drill string as set forth in the Background section herein). Different users of the method and system may use different levels of granularity. For example, the Driller (drilling unit operator) is likely to be interested in stand by stand information, while the wellbore operator or wellbore designer is more likely to be interested in the overall trip information.

It will be appreciated by those skilled in the art that tripping operations are most commonly conducted by assembling or disassembling multiple segment assemblies, typically each consisting of three segments or joints of drill pipe and/or drill collars, heavy weight drill pipe and/or drilling tools. Each such multiple segment assembly is referred to as a stand. It should be clearly understood that while the present description is made in terms of stands, the use of the methods described herein is not limited to tripping by stands. The methods are equally applicable to single joints or stands having more or fewer than three segments (joints) of the above described items.

While tripping a joint or stand, the Guidance and Statistical Processing Method according to the present disclosure calculates acceleration/deceleration and maximum speed within a selected window or range to either trip in or out of the well without incurring corresponding surge or swab effects or damaging shock and vibration effects. The acceleration/deceleration and maximum speed may be presented to the drilling crew as an idealized target speed profile over time for tripping a particular stand. Such idealized speed profile may then be compared to an actual speed profile obtained by the drilling crew operating the drilling unit, both while and after tripping the particular stand, so that the drilling crew can observe how well their performance matches the idealized speed profile in order to make adjustments so that they improve or maintain performance within a so-called "fast and safe" operating range. Fast and safe in the present context may be used to mean the highest acceleration/speed that may be attained without risk of swab or surge, within a preselected error of uncertainty range. While tripping, the system may display indicators as to when to speed up or slow down movement of the drill string to meet the idealized speed profile. Additionally, the system may generate an alert (visual, audible or otherwise) when predetermined swab or surge conditions or excessive shock and vibration conditions have been met and may provide indication how to mitigate the foregoing alerted conditions. Performance measures of the actual pipe movement may be calculated with respect to the idealized speed profile and occurrence of actual swab and surge and excessive shock and vibration events. Connection time (amount of time used to assemble or disassemble one joint or stand of pipe from the drill string) performance may also be measured and presented along with an expected connection time profile.

For an entire trip, the Guidance and Statistical Processing Method according to the present disclosure may calculate a target average speed profile to be attained at each point in the wellbore (according to drill bit depth). The target average speed profile may represent an ideal speed profile so as to trip the pipe as fast as possible without incurring dangerous (e.g., swab or surge) conditions and may also account for target connection time, acceleration/deceleration, and speed constraints that avoid swab and surge effects and shock and vibration effects. Performance measures may be calculated with respect to the idealized profile and actual swab and surge and shock and vibration events. Actual connection time performance may also be tracked and presented against a predetermined target connection time performance.

In another aspect, a schedule forecast may project delay/advance of other planned drilling activities based on current well state and forecast completion time for the current activity based on current performance calculated as described above. For example, tripping completion may be forecast based on current progress and projections of the current tripping performance to the end of the trip. Additionally, drilling completion may be forecast based on current drilling progress and projections of the current drilling performance to the end of the current wellbore section. These projections may be adjusted by forecast limits or changing conditions.

2. Description of an Example Implementation

Figure 2:
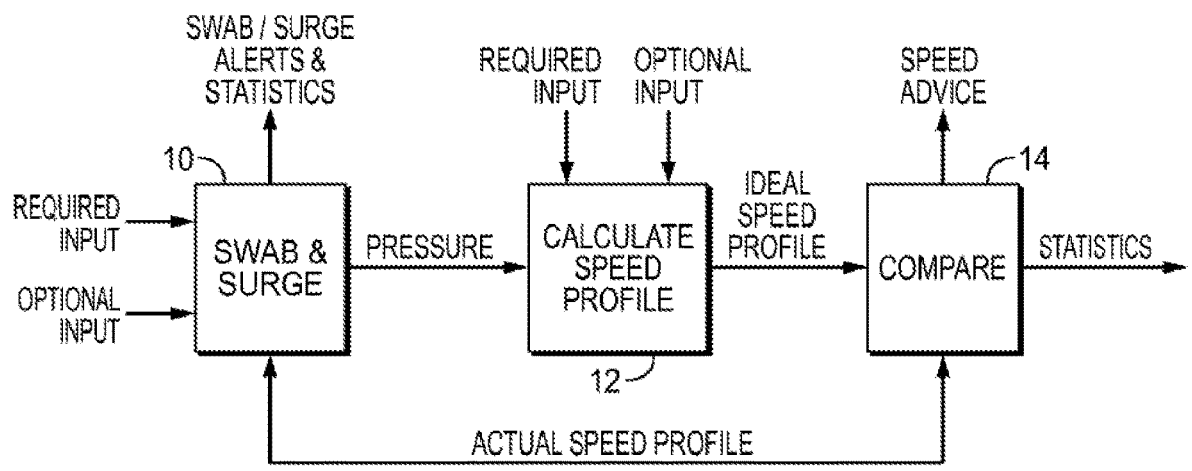
FIG. 2 shows a block diagram of an example of calculating an expected "trip speed profile" for each stand of pipe in a wellbore.

FIG. 2 shows a block diagram illustrating an example process by which the present method may provide acceleration/deceleration and speed target profiles for a stand of the drill string. The swab and surge acceleration and speed range calculations may use the following input parameters, as shown at 10 in FIG. 1:

a) Length, size, unit weight of drill pipe
b) Length, size, unit weight of the drill collars
c) Wellbore diameter (drill bit size)
d) Drilling Fluid viscosity and gel strength;
e) Drilling Fluid density Any value changes in Drilling Fluid parameters (e.g., viscosity, gel strength, density) may require recalculation of surge and swab acceleration and speed ranges. The other values may be expected not to change during any single trip in or out of the wellbore.

Additional, optional inputs, also shown at 10, to the swab and surge calculations may enable more accurate acceleration and speed range calculations. Examples of such additional inputs may include, without limitation:

f) Inclination, azimuth, curvature of the wellbore
g) Heavy weight drill pipe included in the drill string
h) Bottom hole assembly (BHA) component sizes and weights, stabilizer locations, drill bit configuration
i) Drilling Fluid parameters at with respect to temperature
j) Wellbore temperature with respect to depth
k) Measured or offset Formation data The swab and surge calculation may use the foregoing inputs to calculate a drill string speed and acceleration at each depth in the wellbore such that swab and surge and/or excessive shock and vibration events are likely to occur. Swab and surge calculation techniques using any or all of the forgoing inputs are known in the art. Shock and vibration calculation techniques using any or all of the foregoing inputs are also known in the art. The foregoing calculation results in a maximum safe pipe movement speed with respect to depth. The "Calculate Speed Profile" calculation, shown at 12, calculates the speed at each bit depth for the stand that would induce a swab or surge pressure, or induce excessive shock and vibration. The Ideal Speed Profile may be the lower of the swab/surge inducing speed and the excessive shock and vibration speed profile minus a safety factor that ensures that the maximum drill string speed is as fast as possible without incurring the stated adverse conditions. The safety factor may be determined in a number of different ways, the simplest way being user preference. The Ideal Speed profile may be displayed as a band or range of speeds from the maximum safe movement speed to the maximum safe movement speed less the safety margin.

As a stand is tripped, the measured pipe movement speed, from beginning of drill string movement to cessation thereof, may be compared to the ideal speed profile, as shown at 14. Drill string movement speed may be measured by suitable sensors that measure, e.g., height (i.e., vertical position) of a swivel or top drive above the drill floor, wherein such measurements of position made with respect to time may be converted to indication of speed. Such sensors are well known in the art. The depth of the drill string in the wellbore is generally calculated by the length of the assembled drill string components less the measured swivel or top drive height above the drill floor. Speed may be inferred, as explained above, by using the height measurement with respect to time, or may be measured directly by different types of sensors, for example, rotary encoders that measure rotational speed of a winch drum used to extend and retract a drill line used to raise and lower the swivel or top drive (which rotation speed will be related to vertical movement speed of the swivel or top drive). The foregoing information may be entered into a computer and display system which will be described in more detail with reference to FIG. 13.

When the actual drill string speed with respect to the ideal speed is outside of a "Fast and Safe" operating envelope (i.e., the above described speed range), an indicator may be displayed to the user to speed up or slow down longitudinal movement of the drill string in order to adjust the speed to be within the "Fast and Safe" operating range. FIG. 2 shows a graphic example of how the "Fast and Safe" operating range 18 may be presented to the user and how the actual drill string movement speed, shown at curve 16, may be displayed along with the Fast and Safe operating range 18.

Figure 3:
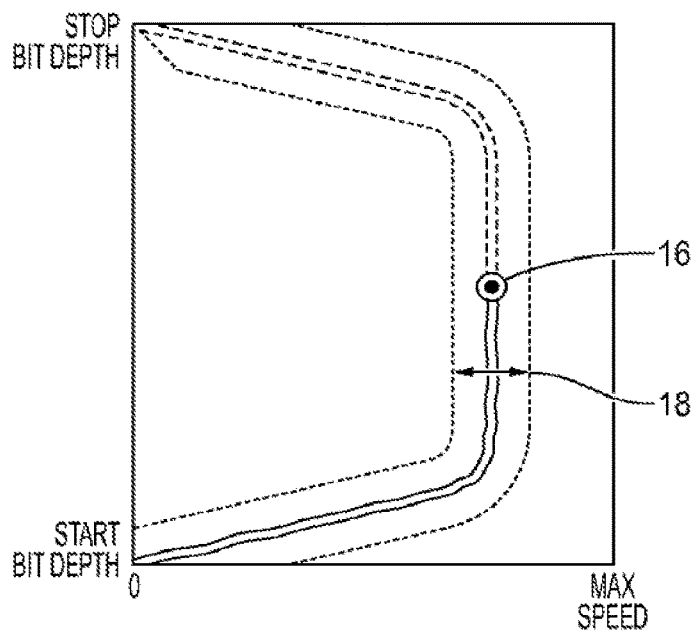
FIG. 3 shows an example display of the expected trip speed profile and an actual trip speed profile for one stand of pipe.
Figure 4A:
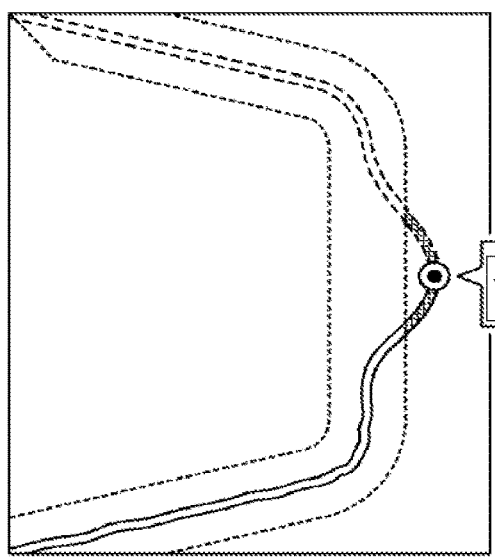
FIGS. 4A and 4B show two example displays for a stand where the expected profile was not followed for the entire stand.
Figure 4B:
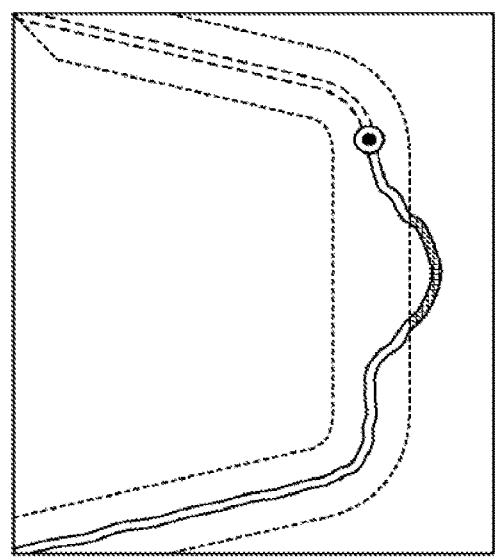

FIGS. 4A and 4B show various examples of display of condition indicators when the actual speed of the drill string is outside the Fast and Safe operating range (18 in FIG. 3). For example, a color or otherwise coded segment of the speed curve may be displayed, as in FIG. 4B, and a warning or other alert text box 19 may be displayed as shown in FIG. 4A. The text box 19 shown in FIG. 4A may also provide an instruction to the user, e.g., the drilling unit operator, an amount by which to change the drill string movement speed, e.g. as a numerical display 19A in units of speed to return the drill string speed to within the "Fast and Safe" range (18 in FIG. 2).

Figure 5A:
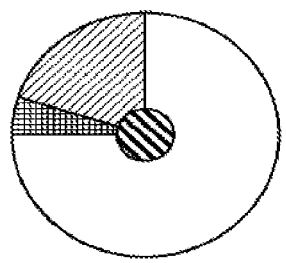
FIGS. 5A and 5B show example displays of time fractions in each of several selected operating conditions for a single stand and cumulatively for each stand in a trip, respectively.
Figure 5B:
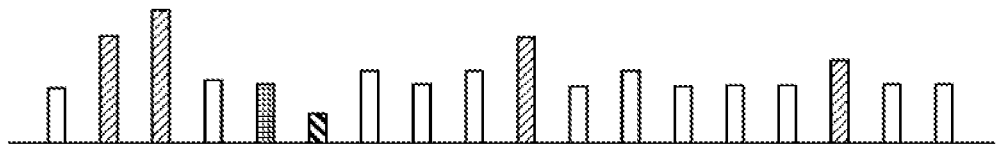

The comparison (14 in FIG. 2) between the ideal speed profile and the actual speed profile may also be used to generate in the computer system (FIG. 13) performance statistics that may be recorded and optionally reported to appropriate personnel, e.g., the wellbore operator and/or the drilling unit operator. The calculated and/or reported statistics include may the fraction (e.g., expressed in percentage) of the total time that the speed for the stand, and for the entire pipe trip that are:

a) Fast and Safe
b) Too Fast (above the "Fast and Safe" operating envelope)
c) Too Slow (below the "fast and safe" operating envelope
d) Generate Swab/Surge conditions
e) Generate excessive Shock and Vibration conditions Additionally, the calculated statistics may show the number and the percentage of stands or fractions thereof that have been moved:

a) fully "fast & safe"
b) too fast or too slow, in whole or in part
c) with swab or surge conditions
d) with shock and vibration conditions
e) fraction too fast which is calculated by comparing the total time to trip the stand to the ideal time if it were tripped in a "fast & safe" manner
f) fraction too slow which is calculated by comparing the total time to trip the stand to the ideal time if it were tripped in a "fast & safe" manner
g) number of times swab or surge conditions were incurred
h) number of times shock and vibration conditions were incurred
i) relative overall speed from stand to stand An example of such statistical displays is shown in FIGS. 5A and 5B. FIG. 5A shows cumulative trip information as above on a per-stand (or per-joint) basis. In some embodiments the display may show the same information cumulatively for an entire trip. FIG. 5B shows the same information for each individual stand in a particular trip in histogram format. The information for individual stands may be color or otherwise coded.

FIG. 6 shows a block diagram of an example process for calculating and comparing an ideal trip time to an actual trip time. An ideal connection time (time to assemble a joint or stand or disassemble the same from the length of drill string still in the wellbore) may be obtained from several sources, for example:

a) user input
b) average from offset wells
c) average top quartile performance from offset wells
d) best performance so far on current well
e) average performance so far on current well An aggregation process at 20 accepts as input the ideal connection time and the ideal speed for each (joint or) stand) as calculated at 12 in FIG. 2) to create an ideal detailed speed profile for a particular drill string trip.

An "Ideal Averaged Speed Profile for Trip" may be calculated, at 22, from the "Ideal Detailed Speed profile for Trip" at 20. The actual averaging algorithm may be selected from among a number of different algorithms and is not intended to limit the scope of the present disclosure. One example is a moving average with a window large enough to encompass exactly one connection. The purpose for calculating an average is to allocate the connection time across the entire trip time so that the individual connection events need not be accounted for as discrete events in the trip speed profile but are in fact accounted for in the trip speed profile.

The "Actual Averaged Speed Profile for Trip" may be calculated using the same averaging algorithm for actual measured connection times.

The Compare process element at 24 compares the ideal averaged trip speed profile to the actual trip speed profile to provide substantially instantaneous feedback to the drilling crew while tripping and to calculate statistics. Alerts may be provided to the drilling crew with respect to values outside the ideal speed profile range similar to those provided as explained with reference to FIGS. 4A and 4B. For example:
 a) Speed is slower than the "fast and safe" zone, please speed up.
 b) Speed is faster than the "fast and safe" zone, slow down now.
 c) Surge or Swab conditions have been met, slow down immediately.
 d) Excessive shock and vibration conditions have been met, slow down immediately.

Figure 7:
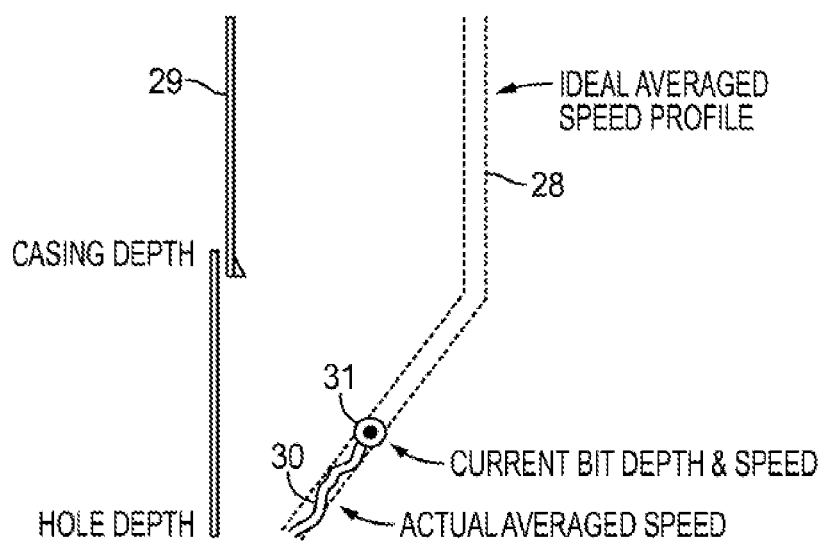
FIG. 7 shows a cumulative display with respect to wellbore depth of an expected speed profile with an actual speed profile overlay.

The statistics may be calculated at 26 in FIG. 6 and may be displayed as the percentage of the time and the number of instances that the speed is:
 a) within the "fast and safe" zone
 b) too fast
 c) too slow The statistics calculation 26 may also include calculating and communicating the number and magnitude of any swab and surge events. One example embodiment of displaying the calculations above is shown in FIG. 7. A representation of the well and any intermediate casing depth is shown at 29. At 28 the ideal average speed profile for any trip may be displayed as a curve. At 30, the actual average speed may be displayed as a curve. A current value of the actual average speed may be displayed as a point at 31.

Figure 8A:
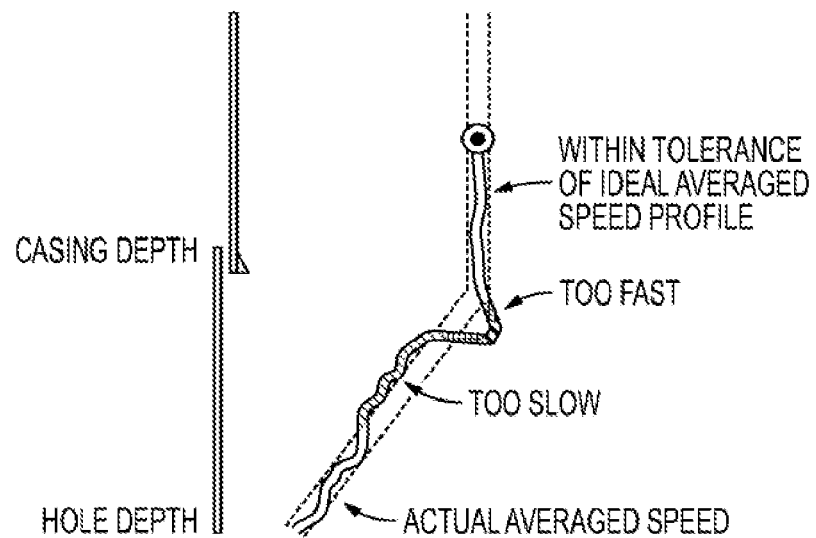
FIGS. 8A and 8B show, respectively, coded versions of the display in FIG. 6 with codes for the type of deviation from the expected speed profile, and cumulative statistics for an entire well.
Figure 8B:
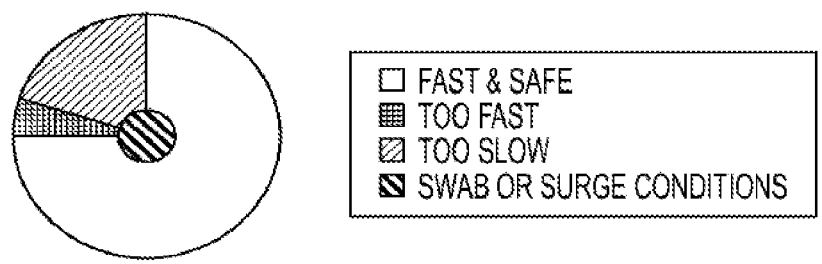

FIG. 8A shows a similar graph to that shown in FIG. 7, but further along the trip, and segments of the actual average speed curve which deviate from the ideal average range may be identified by color or other coding. FIG. 8B shows an example of a "pie chart" cumulative set of statistics calculated using the same data used to calculate the graph of FIG. 8A.

FIG. 9 shows an example of using the calculations as explained with reference to FIG. 6, and displayed with reference to FIG. 8A to compare current well performance to that of other (e.g., "offset" or nearby) wells. In each case, the ideal average trip speed may be normalized for factors such as well depth, and the factors used to calculate the ideal trip speed range as explained with reference to FIG. 2. That is, each well, having its own unique parameters that govern the ideal trip speed range, may have its ideal trip speed range (and correspondingly its average ideal trip speed range) adjusted so that a comparison of ideal trip speed ranges is normalized across all compared wells. The actual average trip speed calculated as explained with reference to FIG. 6 may be similarly normalized. Each well in the comparison may have its normalized actual average trip speed compared to the normalized ideal trip speed range as shown in FIG. 9. Deviations as explained with reference to FIGS. 7, 8A and 8B may be displayed in discrete form or cumulative form for evaluation purposes.

Figure 10:
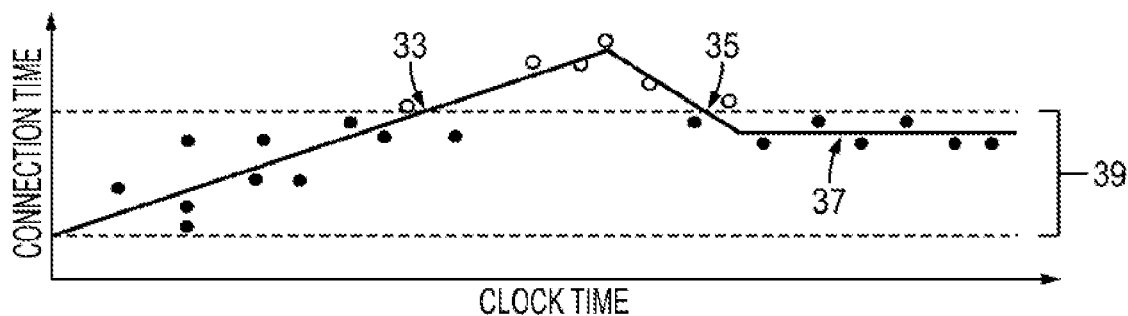
FIG. 10 shows another type of statistical display used to identify operating procedure trends in connection time data.

Referring to FIG. 10, the Guidance and Statistical Processing Method according to the present disclosure may also compile individual connection times statistics. Such statistics may be used to compare and display information on actual connection time with respect to predetermined benchmarks, e.g., connection times from highly performing offset wells or from theoretical ideal times calculated by measurement of connection procedure times under controlled conditions. Additionally, the computer system (FIG. 13) may collect and report connection time trend information for subsets of all the individual connection times, such as whether or not connection time is increasing or decreasing, consistently within the benchmark range, consistently outside of the benchmark range, etc. Various trend identification algorithms, for example and without limitation, one described in U.S. Patent Application Publication No. 2011/0220410 A1 filed by Aldred et al. may be used to determine trends from discrete data points. The graph in FIG. 10 illustrates a series of connection times with the trends identified at 33, 35 and 37 using the foregoing described algorithm. The connection times trended up for a while at 33, and exited the "Fast and Safe" connection time envelope, but then returned to the "fast and safe" envelope at 35 and are remained thereafter at 37 consistently within that envelope. The trending information may be recalculated at every connection point and presented to the appropriate personnel so that suitable actions may be undertaken to adjust the performance to remain within the target "Fast and Safe" envelope 39.

Figure 11:
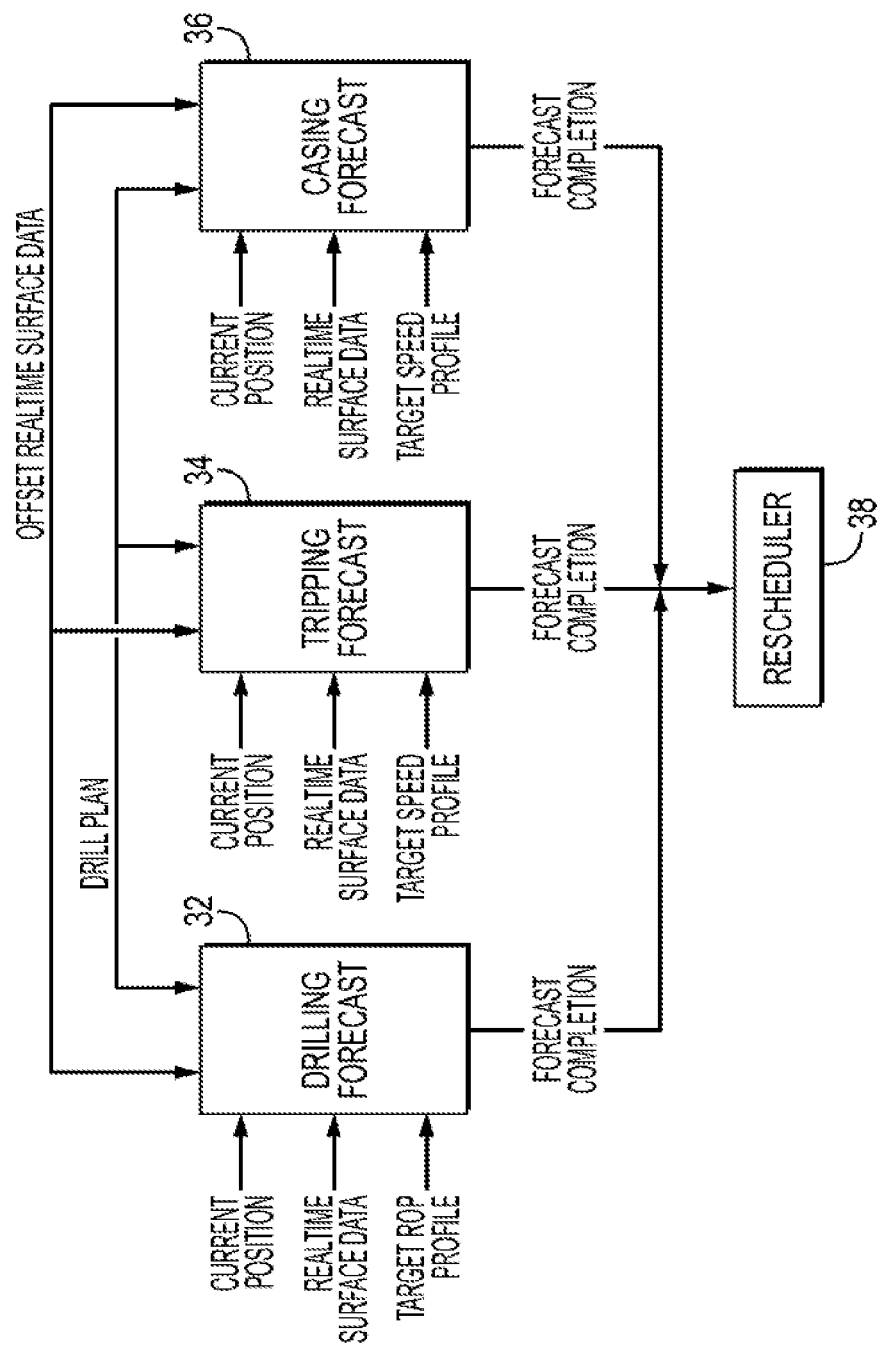
FIG. 11 shows a block diagram of an example procedure for scheduling other wellbore ancillary operations based on actual drilling time and tripping time with reference to planned drilling time and tripping time.

Referring to FIG. 11, a block diagram therein shows elements of an example process to reschedule ancillary operations based on actual performance during drilling and tripping on any particular wellbore. The primary input to the example process may be an output from a drilling plan, which may be generated by the wellbore designer. The drilling plan may be the original drilling plan or a revised drilling plan. A drilling plan is made up of a series of drilling and ancillary activities such as drilling, tripping, casing, cementing, etc. Each activity will have associated therewith what action is to be performed and an associated start and stop time. For example, drilling from a first depth to a second depth may expected to take a predetermined amount of time. The output of the drilling plan may be converted into an initial schedule of, e.g., forecast drilling times at block 32, forecast tripping times, at block 34 and forecast casing running at cementing times at block 36. The foregoing three activities shown in blocks 32, 34 and 36 are only meant to serve as examples and are not an exhaustive list of activities intended to limit the scope of activities according to the present disclosure. The drilling plan may provide not only an amount of time expected to be used in the performance of each activity, but also the sequence in which the activities are to occur, thus enabling estimating an initial start and stop time for each activity. An example of a drilling plan compared to actual performance is described in U.S. Pat. No. 6,233,498 issued to King et al.

Each activity 32, 34, 36 will have a forecasting procedure applied to it that takes into account the original drilling plan data and the current progress of each activity with respect to the original drilling plan. Each activity may optionally have a target speed profile for that particular activity. The forecasting procedure may use the current progress and current speed of each activity to estimate when the particular activity is likely to be complete. The overall drilling plan, i.e., the forecast start and stop times, may be adjusted (either delayed or advanced) based on the completion time estimates for each activity. Forecast start and stop times may be based on a number of criteria, for example:
 a) equal the plan when activity has not yet begun or is proceeding according to plan
 b) be calculated from offset well data based on the activity speed on similar wells
 c) be recalculated from the original plan by using the current performance to predict when the activity will complete if the current performance is maintained
 d) be calculated by using planned performance from this point to predict when the activity will complete.

The schedule forecasting activity may be updated continuously or on demand before or after drilling in order to have a better understanding of when activities are likely to begin and end so that logistics may be planned. The process may be applied to the original drilling plan or any revised drilling plans.

Figure 12:
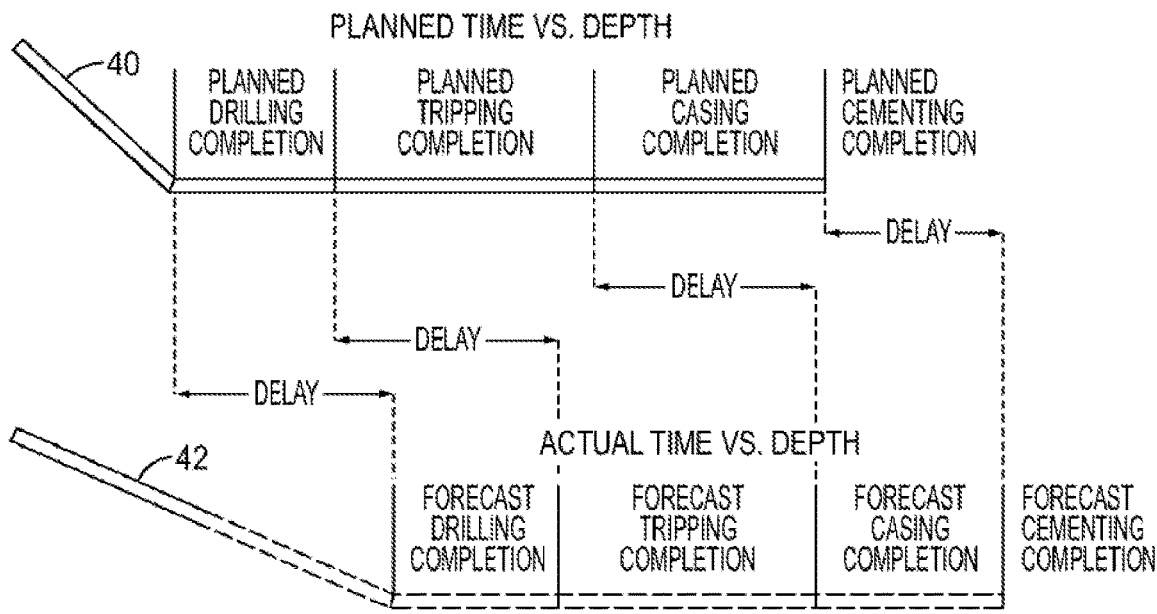
FIG. 12 shows an example time vs. depth curve to assist the wellbore operator in calculating delay or advance of any of the operations described with reference to FIG. 10.

FIG. 12 displays one example of how the Schedule Forecast may be represented. The representation in FIG. 12 compares a planned time vs depth curve 40 to a forecast (updated based on actual rig activity times) time vs depth curve 42. The Schedule Forecast may also be represented, for example, as a Gantt chart. The output is a forecast well activity plan with revised estimates for the start and completion time for all uncompleted/subsequent activities in the drilling plan. The foregoing may be displayed on a well section basis, a specified time horizon basis, or for the remainder of the well. It may optionally be cascaded to a subsequent well planned to be drilled by the same drilling unit.

Figure 13:
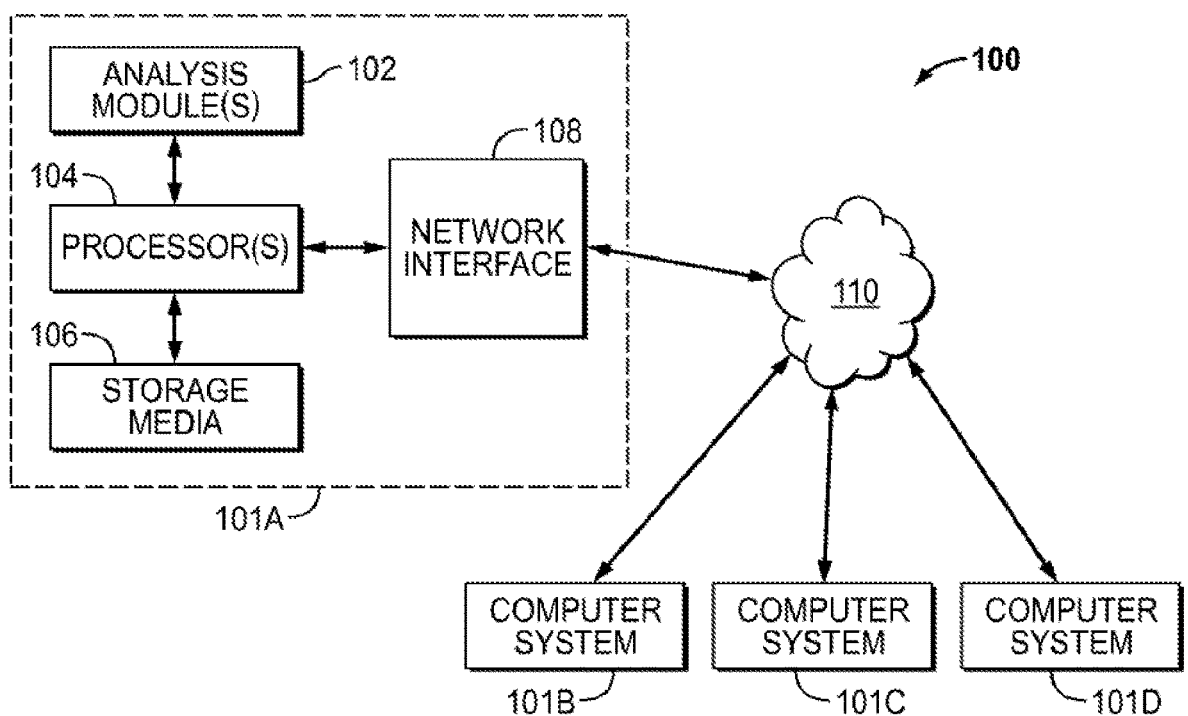
FIG. 13 shows an example computer system on which parts of or all of methods according to the present disclosure may be performed.

FIG. 13 shows an example computing system 100 in accordance with some embodiments. The computing system 100 may be an individual computer system 101A or an arrangement of distributed computer systems. The computer system 101A may include one or more analysis modules 102 that may be configured to perform various tasks according to some embodiments, such as the tasks depicted in FIGS. 4A, 4B, 5, 7, 7, 8A, 8B, and 9 through 12. To perform these various tasks, analysis module 102 may execute independently, or in coordination with, one or more processors 104, which may be connected to one or more storage media 106. The processor(s) 104 may also be connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at the well drilling location, while in communication with one or more computer systems such as 101C and/or 101D that may be located in one or more data centers on shore, aboard ships, and/or located in varying countries on different continents).

A processor can include a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 13 the storage media 106 are depicted as within computer system 101A, in some embodiments, the storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple non-transitory computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 13, and/or computing system 100 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the elements in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method comprising:
 determining an ideal activity speed profile of an activity for a well based at least in part on an actual activity speed profile of the activity for an offset well, wherein the ideal activity speed profile of the activity for the well corresponds to a length of the well, wherein the ideal activity speed profile comprises a plurality of speeds with respect to a plurality of positions over the length of the well, and wherein the determining the ideal activity speed profile of the activity for the well comprises determining a level of activity speed related risk of damage to a wellbore of the well;

forecasting a start time and a stop time using the ideal activity speed profile of the activity;

generating a drilling plan using the start time and the stop time wherein another activity commences after the stop time;

during performance of the activity for the well, receiving data indicative of an actual activity speed of the activity for the well for a corresponding length of the well;

during the performance of the activity, deciding to make an adjustment, from a plurality of adjustments, to the performance of the activity for the well using the ideal activity speed profile and the actual activity speed of the activity for the well, wherein the plurality of adjustments comprise an adjustment that increases the speed of the activity for the well responsive to the actual activity speed being below the ideal activity speed and an adjustment that decreases the speed of the activity for the well responsive to the level being above a predetermined level of risk of damage to a wellbore of the well due to surge; and adjusting the stop time of the drilling plan based on the adjustment to the performance of the activity for the well.

2. The method of claim 1 comprising normalizing the actual activity speed profile of the activity for the offset well and determining the ideal activity speed profile of the activity for the well based at least in part on the normalized actual activity speed profile of the activity for the offset well.

3. The method of claim 1 wherein the length of the well comprises a planned length of the well.

4. The method of claim 1 wherein the length of the well comprises a drilled length of the well.

5. The method of claim 1 comprising altering the drilling plan such that the other activity commences after the adjusted stop time.

6. The method of claim 1 wherein the activity comprises a tripping activity.

7. The method of claim 1 wherein the activity comprises a connection activity.

8. The method of claim 1 wherein deciding to make an adjustment to the performance of the activity for the well comprises deciding to make an adjustment that increases or decreases a speed of the activity for the well.

9. The method of claim 1 wherein determining the ideal activity speed profile of the activity for the well comprises calculating a speed at each drill bit position for a stand.

10. The method of claim 1 wherein determining the ideal activity speed profile of the activity for the well comprises calculating a speed at each drill bit position for a stand that would induce a swab or surge pressure.

11. The method of claim 1 wherein determining the ideal activity speed profile of the activity for the well comprises calculating a speed at each drill bit position for a stand that would induce excessive shock and vibration.

12. The method of claim 1 wherein the ideal speed profile comprises a lower of one of a swab inducing speed or a surge inducing speed.

13. The method of claim 1 wherein the ideal speed profile comprises speeds that are less than speeds of an excessive shock and vibration speed profile.

14. The method of claim 1 wherein the ideal speed profile comprises speeds that are less than speeds of an adverse conditions profile minus a safety factor that ensures that a maximum speed is as fast as possible without incurring the speeds of the adverse conditions profile.

15. A system comprising:

a processor;

memory operatively coupled to the processor;

processor-executable instructions stored in the memory to instruct the system to:

determine an ideal activity speed profile of an activity for a well based at least in part on an actual activity speed profile of the activity for an offset well, wherein the ideal activity speed profile of the activity for the well corresponds to a length of the well, wherein the ideal activity speed profile comprises a plurality of speeds with respect to a plurality of positions over the length of the well, and wherein determination of the ideal activity speed profile of the activity for the well comprises determination of a level of activity speed related risk of damage to a wellbore of the well;

forecast a start time and a stop time using the ideal activity speed profile of the activity;

generate a drilling plan using the start time and the stop time wherein another activity commences after the stop time;

during performance of the activity for the well, receive data indicative of an actual activity speed of the activity for the well for a corresponding length of the well;

during the performance of the activity, decide to make an adjustment, from a plurality of adjustments, to the performance of the activity for the well using the ideal activity speed profile and the actual activity speed of the activity for the well, wherein the plurality of adjustments comprise an adjustment that increases the speed of the activity for the well responsive to the actual activity speed being below the ideal activity speed and an adjustment that decreases the speed of the activity for the well responsive to the level being above a predetermined level of risk of damage to a wellbore of the well due to surge; and adjust the stop time of the drilling plan based on the adjustment to the performance of the activity for the well.

16. One or more tangible computer-readable media that comprise instructions executable by a computer to instruct the computer to:

determine an ideal activity speed profile of an activity for a well based at least in part on an actual activity speed profile of the activity for an offset well, wherein the ideal activity speed profile of the activity for the well corresponds to a length of the well, wherein the ideal activity speed profile comprises a plurality of speeds with respect to a plurality of positions over the length of the well, and wherein determination of the ideal activity speed profile of the activity for the well comprises determination of a level of activity speed related risk of damage to a wellbore of the well;

forecast a start time and a stop time using the ideal activity speed profile of the activity;

generate a drilling plan using the start time and the stop time wherein another activity commences after the stop time;

during performance of the activity for the well, receive data indicative of an actual activity speed of the activity for the well for a corresponding length of the well;

during the performance of the activity, decide to make an adjustment, from a plurality of adjustments, to the performance of the activity for the well using the ideal activity speed profile and the actual activity speed of the activity for the well, wherein the plurality of adjustments comprise an adjustment that increases the speed of the activity for the well responsive to the actual activity speed being below the ideal activity speed and an adjustment that decreases the speed of the activity for the well responsive to the level being above a predetermined level of risk of damage to a wellbore of the well due to surge; and adjust the stop time of the drilling plan based on the adjustment to the performance of the activity for the well.

\* \* \* \* \*